(12) United States Patent
McCann

(10) Patent No.: US 10,033,736 B2
(45) Date of Patent: Jul. 24, 2018

(54) METHODS, SYSTEMS, AND COMPUTER READABLE MEDIA FOR REMOTE AUTHENTICATION DIAL-IN USER SERVICE (RADIUS) TOPOLOGY HIDING

(71) Applicant: Oracle International Corporation, Redwood Shores, CA (US)

(72) Inventor: Thomas Matthew McCann, Raleigh, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 174 days.

(21) Appl. No.: 15/003,647

(22) Filed: Jan. 21, 2016

(65) Prior Publication Data

US 2017/0214691 A1 Jul. 27, 2017

(51) Int. Cl.
H04L 29/06 (2006.01)

(52) U.S. Cl.
CPC ...... *H04L 63/0892* (2013.01); *H04L 63/0435* (2013.01); *H04L 63/10* (2013.01)

(58) Field of Classification Search
CPC .................. H04L 63/0435; H04L 63/0892
See application file for complete search history.

(56) References Cited

U.S. PATENT DOCUMENTS

| | | | |
|---|---|---|---|
| 5,835,087 A | 11/1998 | Herz et al. | |
| 6,185,612 B1 | 2/2001 | Jensen et al. | |
| 7,266,837 B2 | 9/2007 | Monjas-Llorente et al. | |
| 8,127,016 B2 | 2/2012 | Westman et al. | |
| 8,171,032 B2 | 5/2012 | Herz | |
| 8,218,459 B1 | 7/2012 | Stucker | |
| 8,218,490 B2 | 7/2012 | Rydnell et al. | |
| 8,626,157 B2 | 1/2014 | Nas et al. | |
| 8,929,360 B2 | 1/2015 | Agarwal et al. | |
| 9,094,819 B2 * | 7/2015 | McCann | H04L 63/0407 |
| 9,253,163 B2 | 2/2016 | Donovan | |
| 9,967,148 B2 | 5/2018 | Goyal et al. | |

(Continued)

FOREIGN PATENT DOCUMENTS

| | | |
|---|---|---|
| CN | 1964316 | 5/2007 |
| CN | 103039049 B | 8/2016 |

(Continued)

OTHER PUBLICATIONS

Zhang et al. "TOHIP: A topology-hiding multipath routing protocol in mobile ad hoc networks", pp. 109-122 (Year: 2014).*

(Continued)

*Primary Examiner* — Thaddeus J Plecha
(74) *Attorney, Agent, or Firm* — Jenkins, Wilson, Taylor & Hunt, P.A.

(57) ABSTRACT

A method for remote authentication dial-in user service (RADIUS) topology hiding includes, at a RADIUS signaling router including at least one message processor, receiving a RADIUS message. The method further includes determining whether RADIUS topology hiding is indicated for the RADIUS message. The method further includes, in response to determining that RADIUS topology hiding is indicated for the message, performing RADIUS topology hiding for the message. The method further includes forwarding the message to an intended recipient.

28 Claims, 9 Drawing Sheets

(56) References Cited

U.S. PATENT DOCUMENTS

| | | | |
|---|---|---|---|
| 2003/0227894 | A1 | 12/2003 | Wang et al. |
| 2005/0235000 | A1 | 10/2005 | Keil |
| 2006/0155871 | A1* | 7/2006 | Ilkka .............. H04L 29/12009 709/238 |
| 2006/0259759 | A1 | 11/2006 | Maino et al. |
| 2007/0250642 | A1 | 10/2007 | Thubert et al. |
| 2008/0010669 | A1 | 1/2008 | Aittola et al. |
| 2009/0080440 | A1 | 3/2009 | Balyan et al. |
| 2009/0165017 | A1 | 6/2009 | Syed et al. |
| 2009/0313379 | A1* | 12/2009 | Rydnell .............. H04L 63/0407 709/228 |
| 2011/0165901 | A1 | 7/2011 | Baniel et al. |
| 2011/0195710 | A1 | 8/2011 | Nas et al. |
| 2011/0302244 | A1 | 12/2011 | McCann et al. |
| 2012/0155389 | A1 | 6/2012 | McNamee et al. |
| 2012/0157047 | A1 | 6/2012 | Chen et al. |
| 2012/0158994 | A1 | 6/2012 | McNamee et al. |
| 2012/0226814 | A1 | 9/2012 | Stucker |
| 2013/0097418 | A1 | 4/2013 | Bhatt et al. |
| 2013/0151845 | A1 | 6/2013 | Donovan |
| 2013/0185767 | A1* | 7/2013 | Tirupachur Comerica .............................. H04L 9/321 726/4 |
| 2013/0290722 | A1 | 10/2013 | Kall et al. |
| 2016/0352696 | A1* | 12/2016 | Essigmann ......... H04L 63/0414 |
| 2017/0012824 | A1 | 1/2017 | Goyal et al. |

FOREIGN PATENT DOCUMENTS

| | | |
|---|---|---|
| EP | 1 848 150 A1 | 10/2007 |
| EP | 1 873 980 A1 | 1/2008 |
| KR | 10-1506232 | 3/2015 |
| WO | WO 2007/125498 A1 | 11/2007 |
| WO | WO 2011/100166 A2 | 8/2011 |
| WO | WO 2011/156274 A2 | 12/2011 |

OTHER PUBLICATIONS

Non-Final Office Action for U.S. Appl. No. 14/795,601 (dated Aug. 18, 2017).

Notification to grant a Chinese patent for Chinese Patent Application No. ZL201180032307.4 (dated Jun. 23, 2016).

Extended European Search Report for European Application No. 11792956.2 (dated Feb. 8, 2016).

Notice of Allowance for U.S. Appl. No. 13/712,481 dated Oct. 20, 2015.

Notice of Allowance for U.S. Appl. No. 13/712,481 dated Sep. 25, 2015.

Notification of the Second Office Action for Chinese Application No. 201180032307.4 (dated Jul. 17, 2015).

Commonly-assigned, co-pending U.S. Appl. No. 14/795,601 for "Methods, Systems, and Computer Readable Media for Selective Diameter Topology Hiding." (Unpublished, filed Jul. 9, 2015).

Non-Final Office Action for U.S. Appl. No. 13/712,481 (dated Apr. 29, 2015).

Notice of Allowance for U.S. Appl. No. 13/154,119 dated Apr. 16, 2015.

Notice of Allowance and Applicant Initiated Interview Summary for U.S. Appl. No. 13/154,119 dated Mar. 17, 2015.

Advisory Action Before the Filing of an Appeal Brief for U.S. Appl. No. 13/712,481 (dated Mar. 11, 2015).

Email Regarding Decision to Grant for Korean Patent Application No. 2012-7034449 (dated Mar. 2, 2015).

Final Office Action for U.S. Appl. No. 13/712,481 (dated Dec. 3, 2014).

Notification of the First Office Action for Chinese Patent Application No. 201180032307.4 (dated Nov. 4, 2014).

Office Action for Korean Patent Application No. 2012-7034449 (dated Oct. 14, 2014).

Non-Final Office Action for U.S. Appl. No. 13/712,481 (dated May 8, 2014).

Notice of Preliminary Rejection for Korean Patent Application No. 2012-7034449 (dated Apr. 25, 2014).

Advisory Action for U.S. Appl. No. 13/154,119 dated Jan. 22, 2014.

Final Office Action for U.S. Appl. No. 13/154,119 dated Oct. 25, 2013.

Notice of Allowance and Fee(s) Due for U.S. Appl. No. 13/021,402 (dated Sep. 9, 2013).

Non-Final Office Action for U.S. Appl. No. 13/154,119 dated May 2, 2013.

Communication of European publication No. and information on the application of Article 67(3) EPC for European Patent Application No. 11792956.2 (dated Mar. 13, 2013).

Non-Final Office Action for U.S. Appl. No. 13/021,402 (dated Nov. 8, 2012).

Notification of Transmittal of the International Search Report and the Written Opinion of the International Searching Authority, or the Declaration for International Application No. PCT/US2011/039285 (dated Feb. 9, 2012).

Notification of Transmittal of the International Search Report and the Written Opinion of the International Searching Authority, or the Declaration for the International Application No. PCT/US2011/023752 (dated Oct. 26, 2011).

"3rd Generation Partnership Project; Technical Specification Group Core Network and Terminals; Evolved Packet System (EPS); Mobiiity Management Entity (MME) and Serving GPRS Support Node (SGSN) related interfaces based on Diameter protocol (Release 10)," 3GPP TS 29.272, V10.2.0, pp. 1-95 (Mar. 2011).

3GPP, "3rd Generation Partnership Project; Technical Specification Group Core Network and Terminals; InterWorking Function (IWF) Between MAP Based and Diameter Based Interfaces (Reiease 9):" 3GPP TS 29.305 V9.0.0, pp. 1-63 (Dec. 2009).

Rouse, M., "Platform." searchservervirtualization.techtarget.com/definition/platform, pp. 1-2 (Sep. 2006).

Calhoun et al., "Diameter Base Protocol," RFC 3588, pp. 1-147 (Sep. 2003).

Calhoun et al., "Diameter Base Protocol," draft-ietf-aaa-diameter-07, Section 6.3, p. 68 (Jul. 2001).

Calhoun et al., "Diameter Base Protocol," The Internet Society, pp. 1-64 (Mar. 2001).

Farago et al., "Virtual path network topology optimization using random graphs," INFOCOM '99, 18th Annual Joint Conference of the IEEE Computer and Communications Societies, vol. 2, pp. 491-496 (Mar. 1999).

Goldschlag et al., "Hiding Routing Information," Springer Berlin Heidelberg, First International Workshop Cambridge, U.K., May 30-Jun. 1, 1996, Information Hiding Lecture Notes in Computer Science, vol. 1174, pp. 137-150 (1996).

Notification of the Third Office Action for Chinese Application No. 201180032307.4 (dated Jan. 25, 2016).

"RADIUS," http://en.wikipedia.org/wiki/RADIUS#Accounting, pp. 1-17 (Nov. 27, 2015).

"EliteDSC—LTE Roaming," http://www.elitecore.com/telecompractices/lteroaming.html, pp. 1-2 (Copyright 2013).

"Topology Hiding," Chapter 13, Cisco Unifed Border Element (SP Edition) Configuration Guide: Distributed Model, pp. 13-1-13-10 (Mar. 29, 2011).

Chiba et al., "Dynamic Authorization Extensions to Remote Authentication Dial In User Service (RADIUS)," RFC 5176, pp. 1-31 (Jan. 2008).

"Features—Kamailio (OpenSER) SIP Server," http://www.kamailio.org/w/features/, pp. 1-3 (Copyright 2008-2015).

Rigney et al., "RADIUS Accounting," RFC 2866, pp. 1-28 (Jun. 2000).

Rigney et al., "Remote Authentication Dial in User Service (RADIUS)," RFC 2865, pp. 1-68 (Jun. 2000).

Notice of Allowance and Fee(s) Due for U.S. Appl. No. 14/795,601 (dated Dec. 28, 2017).

Applicant Initiated Interview Summary for U.S. Appl. No. 14/795,601 (dated Nov. 24, 2017).

Communication pursuant to Article 94(3) EPC for European Patent Application Serial No. 11 792 956.2 (dated Apr. 23, 2018).

* cited by examiner

METHODS, SYSTEMS, AND COMPUTER READABLE MEDIA FOR REMOTE AUTHENTICATION DIAL-IN USER SERVICE (RADIUS) TOPOLOGY HIDING

TECHNICAL FIELD

The subject matter described herein relates to implementing topology hiding for RADIUS networks. More particularly, the subject matter described herein relates to methods, systems, and computer readable media for remote authentication RADIUS topology hiding.

BACKGROUND

In telecommunications networks, data networks and combinations thereof, it is sometimes desirable to implement topology hiding to prevent the sharing of network topology information between networks unless a trust relationship exists between the networks. For example, it might be desirable for an access network service provider to implement topology hiding to prevent a core network service provider from discovering the topology of the access network service provider's network and vice versa. Topology hiding may be implemented for reasons related to competition between service providers, network security, or both. Topology hiding may be implemented for network security purposes to prevent potential attackers from learning network topology information that could be used to generate attacks. However, if a trust relationship exists between sending and receiving entities, topology hiding may not be needed. Thus, it is desirable to selectively implement topology hiding in situations where trust does not exist between sending and receiving entities.

While topology hiding has been implemented or at least described for some types of networks, it is not believed that an efficient mechanism exists for topology hiding for RADIUS networks. The RADIUS protocol and its extensions are defined in various IETF Requests for Comment (RFCs), including IETF RFC 2865 (the base RADIUS protocol) and IETF RFC 5176 (dynamic RADIUS authorization). Neither IETF RFC 2865 nor 5176 specifies a mechanism for RADIUS topology hiding or when or how to trigger such a mechanism.

Accordingly, there exists a need for methods, systems, and computer readable media for RADIUS topology hiding.

SUMMARY

A method for remote RADIUS topology hiding includes, at a RADIUS signaling router including at least one message processor, receiving a RADIUS message. The method further includes determining whether RADIUS topology hiding is indicated for the RADIUS message. The method further includes, in response to determining that RADIUS topology hiding is indicated for the message, performing RADIUS topology hiding for the message. The method further includes forwarding the message to an intended recipient.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
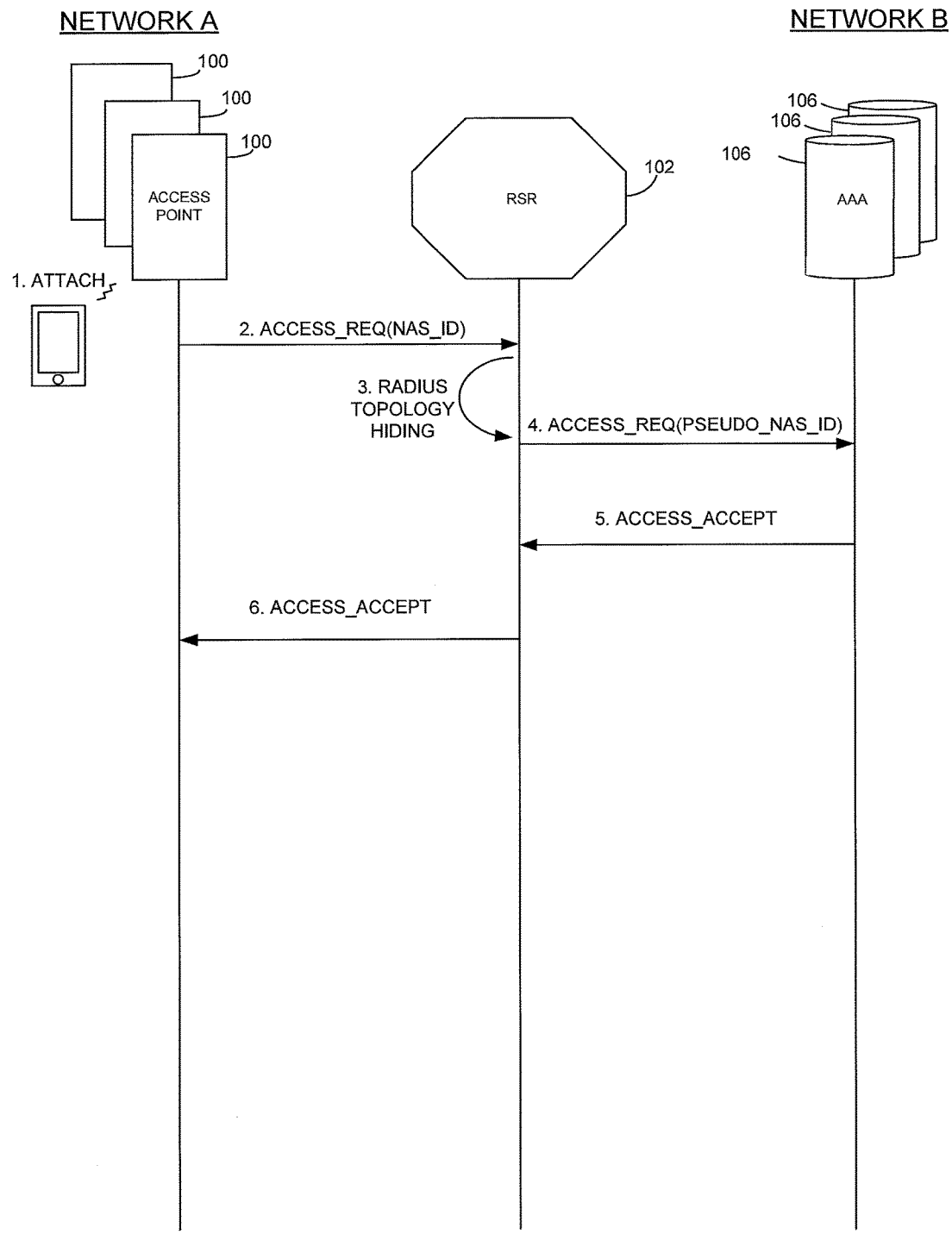
FIG. 1 is a network and message flow diagram illustrating RADIUS topology hiding between networks performed by a RADIUS signaling router according to an embodiment of the subject matter described herein.

FIG. 1 is a network and message flow diagram illustrating RADIUS topology hiding performed by a RADIUS signaling router according to an embodiment of the subject matter described herein. Referring to FIG. 1, a plurality of access points 100 located in a network labeled network A are connected to a RADIUS signaling router 102. Access points 100 may be any suitable nodes through which user devices can connect to access network (Network A in FIG. 1). In one example, access points 100 may be Wi-Fi access points that implement any of the IEEE 802.11 family of protocols. In RADIUS networks, access points 100 are referred to as network access servers or NASs. Each access point or NAS 100 includes a RADIUS identifier referred to in IETF RFCs 2865 and 5176 as a NAS ID. Since the NAS ID uniquely identifies a NAS if RADIUS topology hiding is not implemented, learning the NAS IDs used by a network can provide information about the network topology. Accordingly, it may be desirable to implement RADIUS topology hiding by selectively replacing the NAS ID in certain messages with a pseudo NAS ID.

In FIG. 1, another RADIUS parameter that may be used to identify a NAS is the NAS IP address. The NAS IP address is carried as an attribute in RADIUS certain request messages originating from a NAS. The NAS IP address is also carried in certain messages from a RADIUS server to a NAS. Because the NAS IP address (either IPv4 or IPv6) can be used to uniquely identify a NAS, it may be desirable to replace or obscure the NAS IP address in addition to replacing or obscuring NAS ID to implement RADIUS topology hiding.

In order to implement RADIUS topology hiding, RADIUS signaling router may be configured by the user with a list of real NAS IDs whose topology is being hidden and a maximum number of pseudo NAS IDs for each real NAS ID. RSR 102 may then generate a set of pseudo NAS IDs per real NAS ID. This can result in different numbers of pseudo NAS IDs per real NAS ID. In FIG. 1, access points 100 may be assigned NAS IDs: NAS 1, NAS 2, and NAS 3. The user may configure any number of pseudo NAS IDs for each real NAS ID. For purposes of this example, it can be assumed RSR 102 is configured such that each real NAS ID has a maximum of 5 pseudo NAS IDs and that RSR 102 automatically generates 3, 5, and 4 pseudo NAS IDs for real. NAS IDs, 1, 2, and 3, respectively Table 1 shown below illustrates an exemplary configuration of real NAS IDs and pseudo NAS IDs that may be generated and used by RADIUS signaling router 102.

TABLE 1

Mappings between Real and Pseudo NAS Identifiers

| REAL NAS ID | PSEUDO NAS ID |
|---|---|
| NAS 1 | PSEUDO NAS 1 |
|  | PSEUDO NAS 2 |
|  | PSEUDO NAS 3 |
| NAS 2 | PSEUDO NAS 4 |
|  | PSEUDO NAS 5 |
|  | PSEUDO NAS 6 |
|  | PSEUDO NAS 7 |
|  | PSEUDO NAS 8 |
| NAS 3 | PSEUDO NAS 9 |
|  | PSEUDO NAS 10 |
|  | PSEUDO NAS 11 |
|  | PSEUDO NAS 12 |

From Table 1 it can be seen that a number of pseudo NAS identifiers is generated and stored in memory for each real NAS identifier. Mapping data, such as that illustrated in Table 1 can be stored in memory of RADIUS signaling router 102 and used to perform RADIUS topology hiding. In performing RADIUS topology hiding, the real NAS identifiers may be replaced in messages directed to untrusted networks to hide the identity of the real NAS and also to hide the topology of the protected network. In the reverse direction, the pseudo NAS identifiers may be replaced in certain messages with the real NAS identifiers.

Similar data may be generated stored by RSR 102 and used to map real NAS IP addresses to pseudo NAS IP addresses. That is, RSR 102 may be configured with a list of real NAS IP addresses and a maximum number of pseudo NAS IP addresses per real NAS IP address. RSR 102 may then automatically generate a set of pseudo NAS IP addresses per real NAS IP address, resulting in different numbers of NAS IP address per real NAS IP address. Table 2 shown below illustrates exemplary mappings that may be generated and stored by RSR 102 for mapping real NAS IP addresses to pseudo NAS IP addresses and vice versa.

TABLE 2

Real NAS IP to Pseudo NAS IP Mappings

| REAL NAS IP ADDRESS | PSEUDO NAS IP ADDRESS |
|---|---|
| 192.168.0.1 | 255.255.255.1 |
|  | 255.255.255.2 |
|  | 255.255.255.3 |
| 192.168.0.2 | 255.255.255.4 |
|  | 255.255.255.5 |
|  | 255.255.255.6 |
|  | 255.255.255.7 |
| 192.168.0.3 | 255.255.255.8 |
|  | 255.255.255.9 |
|  | 255.255.255.10 |
|  | 255.255.255.11 |
|  | 255.255.255.12 |

Like Table 1, data such as that illustrated in Table 2 may be generated by RSR 102, stored in memory of RSR 102, at configuration time and used by RADIUS signaling router 102 to map real NAS IP addresses to pseudo NAS IP addresses for messages directed to untrusted networks. In the illustrated example, it is assumed that RSR 102 is configured with a maximum number of 5 pseudo NAS IP addresses per real NAS IP address, and generates 3, 4, and 5 pseudo NAS IP addresses for the three real NAS IP addresses illustrated in Table 2. The data illustrated in Table 2 may also be used to perform reverse mappings from pseudo NAS IP addresses to real NAS IP addresses.

When a user equipment (UE) or other device, such as UE 104, desires to access the network, access point to which UE 104 connects may contact one of authentication, authorization, and accounting (AAA) servers 106 located in the core network, which is labeled network B in FIG. 1. In this example, it is assumed that a trust relationship does not exist between network A and network B. Accordingly, network A may wish to hide RADIUS topology information, such as the NAS IDs and NAS IP addresses of access points 100 or the number of access points 100 from network B. Accordingly, RADIUS signaling router 102 may perform RADIUS topology hiding for messages originating from access points 100 that are destined for network B. RADIUS signaling router 102 may also perform reverse RADIUS topology hiding for messages originating from network B that are destined to network A and that carry a pseudo NAS identifier of one of access points 100. Reverse RADIUS topology hiding includes mapping a pseudo NAS IP address and ID to a real NAS IP address and ID. An example of reverse RADIUS topology hiding will be described in detail below.

In the illustrated example, when UE seeks to attach to the network, UE first contacts one of access points 100 to request access to the network (step 1). The access point 100 to which UE 104 connects sends a RADIUS access request message to RADIUS signaling router 102 (step 2). A RADIUS access request message is sent by a RADIUS client to a RADIUS server to convey information to determine whether a user is able to access a specific NAS and any special services requested for that user. The RADIUS access request message includes the NAS IP address of the sending NAS, the NAS identifier, or both. In the example illustrated in FIG. 1, it is assumed that the access request message includes the NAS ID of the access point 100 that transmitted the message to RADIUS signaling router 102. RADIUS signaling router 102 determines whether RADIUS topology hiding is indicated for the access request message (step 3). This determination may be performed by accessing stored trust relationship information to determine whether a trust relationship exists with the destination network or node. RADIUS signaling router 102 may be preconfigured with trust relationships for the network in which RADIUS signaling router 102 operates. For example, network A may not trust network B and may therefore configure RADIUS topology hiding for messages originating from network A that are destined for network B. Alternatively, network A may implement RADIUS topology hiding by default for RADIUS messages originating from network A unless RADIUS signaling router 102 is configured with a trust relationship for a particular destination network.

Table 3 below illustrates exemplary trust relationship information that may be stored in memory of RADIUS signaling router 102, assuming that RADIUS signaling router 102 operates on network A.

TABLE 3

Trust Relationship Information

| Destination Network or Realm | Trust Relationship |
|---|---|
| Network B | No |
| Network C | Yes |

RADIUS signaling router 102 may use information such as that illustrated in Table 3 to determine whether a trust relationship exists for a given message originating from network A. For example, if a message is destined for network B, then RADIUS signaling router 102 may determine that a trust relationship exists, and topology hiding is not indicated. If, on the other hand, a RADIUS signaling message is destined for network C, RADIUS signaling router may determine from the data in Table 3 that a trust relationship exists and RADIUS topology hiding can be bypassed.

In the example illustrated, it is assumed that RADIUS topology hiding is indicated for messages destined for network B. Accordingly, RADIUS signaling router 102 modifies the access request message by replacing the NAS ID and the NAS IP in the message with a pseudo NAS ID and a pseudo NAS IP address respectively. The term "pseudo NAS identification parameter" will hereinafter be used to refer generically to the pseudo NAS ID, the pseudo NAS IP address, or both. Two methods for determining the pseudo NAS identification parameters to be inserted in the message—one stateless and one stateful—will be described below. Once RADIUS signaling router 102 replaces the NAS identification parameters in the message with the pseudo NAS identification parameters, RADIUS signaling router 102 forwards the RADIUS access request message to network B (step 4). Because the message does not include the real NAS identification parameters of any of access points 100, the RADIUS identity of the sending access point is hidden. In addition, as illustrated in Table 1, a one to one mapping may not exist between real NAS identification parameters and pseudo NAS identification parameters such that the number of access points, which is indicative of the topology of network A, is also hidden from network B.

When the AAA server 106 receives the RADIUS access request message, the AAA server 106 either accepts or rejects the access. In this example, it is assumed that the access is accepted. Accordingly, the AAA server 106 sends a RADIUS access accept message to the originating access point 100 via RADIUS signaling router 102 (steps 5 and 6). The access accept message contains configuration information necessary to begin delivery of the requested services to the user. The access accept message includes the identifier field copied from the identifier field of the access request message. The identifier is used by the sending access point to match the access accept message with a pending access request. The access accept message is not required to include the NAS identifier of the sending access point. Accordingly, reverse topology hiding processing is not required by RADIUS signaling router 102. RADIUS signaling router 102 forwards the access accept message to the sending access point. The access point uses the identifier field to match the access accept with the pending access request and provides the requested services to UE 104. Thus, the transaction illustrated in FIG. 1 of access request and access accept is stateless from the point of RADIUS signaling router 102 and only required RADIUS topology hiding processing for the access request message. Accordingly, the topology hiding that is implemented by RADIUS signaling router 102 can be stateless where a pseudo NAS identifier is assigned to the access request message and no session state is maintained by RADIUS signaling router 102.

Figure 2:
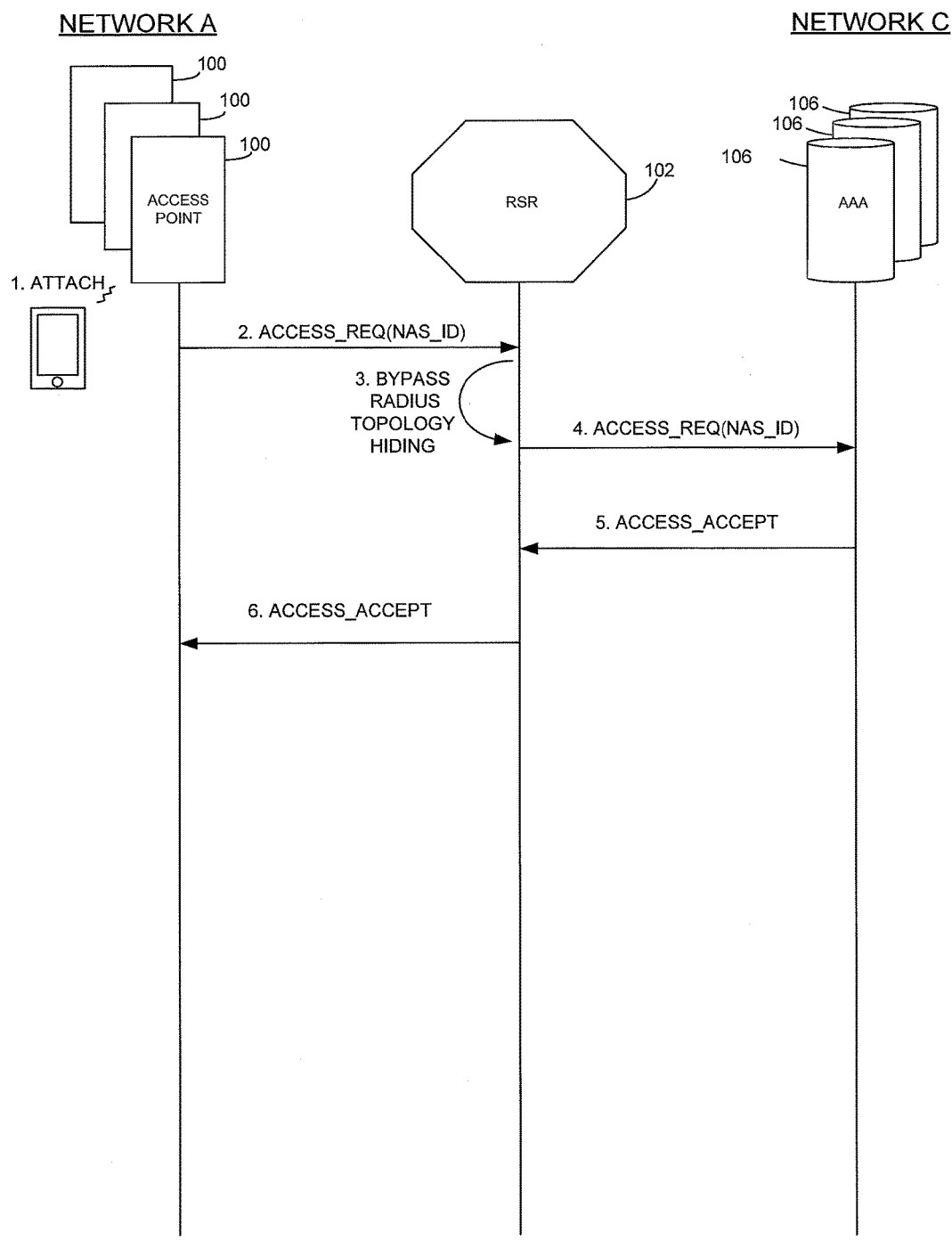
FIG. 2 is a network and message flow diagram illustrating the bypassing of RADIUS topology hiding when a trust relationship exists between sending and receiving networks.

FIG. 2 is a network diagram illustrating processing by RADIUS signaling router 102 when it is determined that a trust relationship exists between the sending and receiving networks. Referring to FIG. 2, access points 100 in network A are connected to RADIUS signaling router 102, as illustrated in FIG. 1. However, in FIG. 2, AAA servers 106 are located in a different network, labeled network C. In this example, it is assumed that a trust relationship exists between network A and network C. Accordingly, in the example illustrated in FIG. 2, when UE 104 seeks to access the network by contacting one of access points 100 (step 1), the access point 100 sends a RADIUS access request message with the NAS identification parameters of the access point 100 to RADIUS signaling router 102 (step 2). RADIUS signaling router 102 examines stored trust information, such as that illustrated in Table 3, and determines that a trust relationship exists with the intended recipient, and therefore no RADIUS topology hiding is needed (step 3). Accordingly, RADIUS signaling router 102 forwards the access request message to one of AAA servers 106 in network C without replacing the NAS identification parameters of the originating access point (step 4). The AAA server 106 receives the access request message and in this example grants access to the NAS. Accordingly, the AAA server 106 sends an access accept message to the sending access point 100 via RADIUS signaling router 102 (steps 5 and 6). Thus, in the example in FIG. 2, RADIUS topology hiding is bypassed when a trust relationship exists between sending and receiving networks.

Stateful and Stateless RADIUS Topology Hiding

A RADIUS signaling router according to an embodiment of the subject matter described herein can implement stateless or stateful topology hiding for sessionless RADIUS interfaces, such as authentication interfaces as illustrated in FIG. 1. Stateless topology hiding refers to algorithmically selecting one of the pseudo NAS identifiers generated and stored for a real NAS identifier, replacing the real NAS identifier in a request message, and not storing any session state or the new NAS identifier assigned to the message. Stateless topology hiding is possible for sessionless transactions because there is no need to remember the pseudo NAS assigned to a particular message as subsequent messages either do not carry the NAS ID or are associated with different transactions.

Some RADIUS transactions, such as accounting transactions, are session based where multiple message exchanges occur between the RADIUS client and the RADIUS server and are associated with the same session. If topology hiding is implemented for a session based interface, the topology hiding is preferably stateful unless a one-to-one mapping exists between real and pseudo NAS identifiers. Using a one-to-one mapping between real and pseudo NAS identifiers can be implemented, but is not desirable for topology hiding, as the number of pseudo NAS identifiers used in such a network is indicative of the number of real NAS identifiers, and the number of real NAS identifiers is indicative of the topology of the network. Accordingly, stateful RADIUS topology hiding is preferably implemented on session based interfaces.

Figure 3:
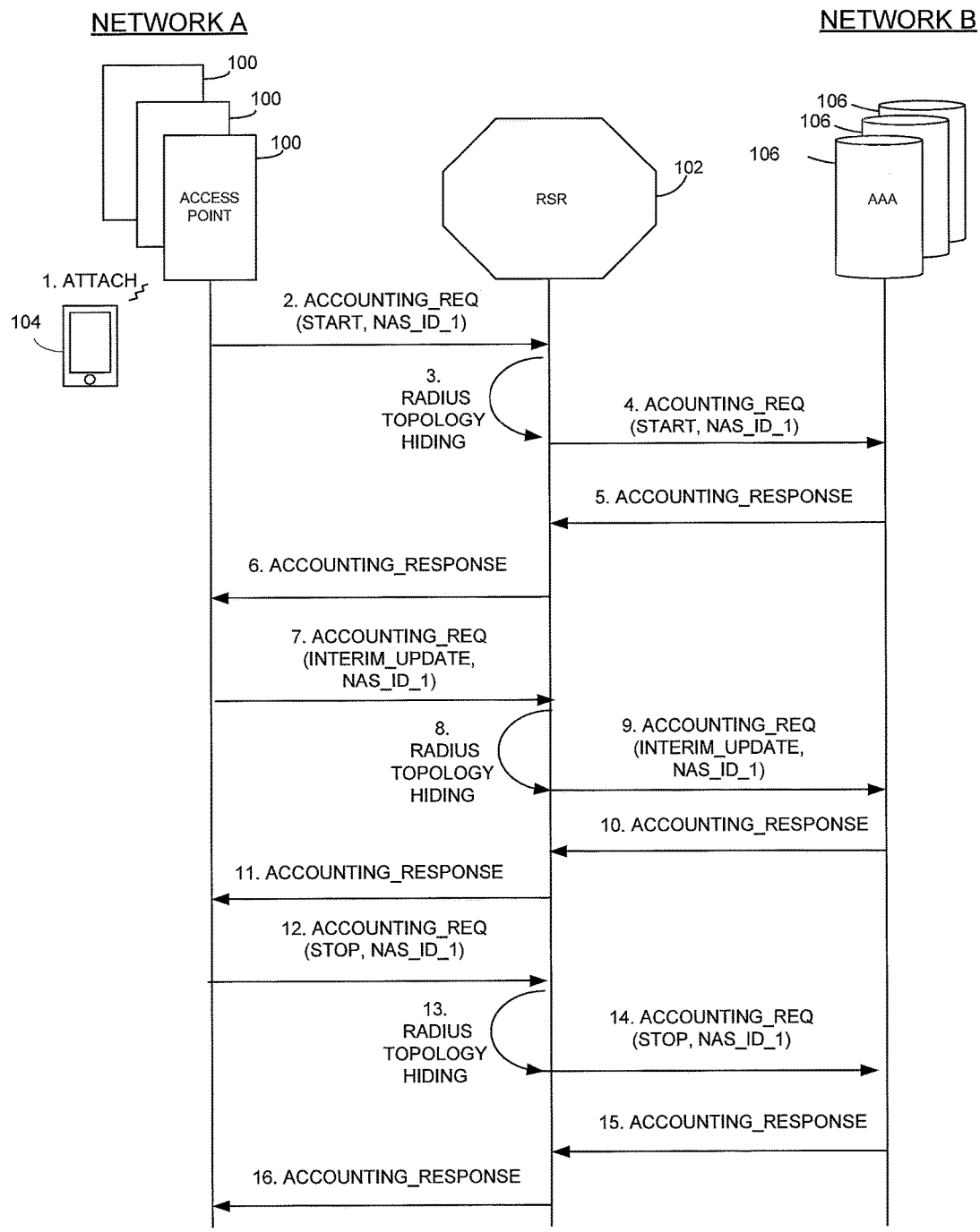
FIG. 3 is a network and message flow diagram illustrating stateful RADIUS topology hiding for a RADIUS accounting session according to an embodiment of the subject matter described herein.

Stateful RADIUS topology hiding refers to the RSR assigning a pseudo NAS identifier to a real NAS identifier in a message and storing the association between the pseudo NAS identifier and real NAS identifier for the duration of a session so that subsequent messages associated with the same session will receive the same mapping or unmapping as the original message. FIG. 3 is a network and message flow diagram illustrating stateful RADIUS topology hiding with a session based RADIUS interface according to an embodiment of the subject matter described herein. Referring to FIG. 3, in step 1, UE 104 attaches to one of access points 100 and initiates a session, such as a voice over IP call or a streaming video connection that requires an accounting session. Accordingly, in step 2, the access point 100 to which UE 104 attaches sends a RADIUS accounting request message with the NAS ID of the sending access point 100 to one of AAA servers 106 via RSR 102. The accounting request includes NAS identification parameters of the sending access point 100 as well as a start parameter or attribute indicating the start of the accounting session. The purpose of the accounting request message is to convey information to the AAA server 106 used to provide accounting for the service provided to the user. Upon receipt of the accounting request message, RSR 102 determines that the destination realm is untrusted and therefore implements RADIUS topology hiding by algorithmically, e.g., randomly or pseudo randomly, selecting a pseudo NAS ID for the real NAS ID in the message and replacing the real NAS ID in the message with the pseudo NAS ID (step 3). In this example, RADIUS signaling router 102 preferably also stores the association between the accounting session, the real NAS ID, and the pseudo NAS ID such that subsequent messages associated with the same session can receive the same pseudo NAS identifier. Thus, RADIUS topology hiding performed by RSR in FIG. 3 is stateful. In step 4, RADIUS signaling router 102 sends the accounting request start message with the pseudo NAS identifier to one of AAA servers 106. The particular AAA server 106 may be selected based on any suitable criteria, such as load sharing.

The receiving AAA server 106 receives the request, starts an accounting session, and sends an accounting response message (steps 5 and 6) to the sending NAS or access point 100 via RSR 102. The accounting response message is not required to include the NAS identifier. Instead, the accounting response includes an identifier field that is a copy of the identifier from the accounting request message that the sending NAS can use to match the response to the pending request. In step 6, RSR 102 sends the RADIUS accounting response to the sending access point 100.

Once the accounting session is opened, the sending access point 100 may send accounting request messages containing an account status type of interim update to update the AAA server 106 with the status of the accounting session. The interim update message typically conveys the current session duration and information on current data usage. Like the original accounting request message, the interim update request messages include the real NAS ID of the sending access point 100. Accordingly, in step 7, RADIUS signaling router 102 performs topology hiding for the interim update accounting request message. However, in step 8, rather than randomly selecting the pseudo NAS ID, RADIUS signaling router 102 performs stateful topology hiding by accessing the record stored for the accounting session, selecting the pseudo NAS ID stored for the session, and replacing the real NAS ID in the message with the pseudo NAS ID. In step 9, RADIUS signaling router 102 sends the accounting request message with the pseudo NAS ID stored for the session to AAA server 106.

In step 10, AAA server 106 generates and sends an accounting response message to RSR 102. The accounting response message is not required to carry the NAS ID of access point 100. According, the is no need for RSR 102 to perform reverse RADIUS topology hiding or RADIUS topology hiding unmapping. In step 11, RSR 102 sends the accounting response message to the sending access point 100.

In step 12, the originating access point 106 sends an accounting request stop message indicating the end of the accounting transaction. The accounting request stop message includes the NAS ID of the sending access point 106. Accordingly, in step 13, RADIUS signaling router 102 performs stateful topology hiding by mapping the real NAS identifier to the pseudo NAS identifier previously stored for the accounting session and, in step 14, sends the accounting request message with the stop attribute and the pseudo NAS identifier to the AAA server 106. In step 15, the AAA server 106 sends an accounting response message to RSR 102. In step 16, RSR 102 sends the accounting response message to the access point 100. Thus, as illustrated in FIG. 3, RADIUS signaling router 102 performs stateful RADIUS topology hiding for an accounting session.

In the examples illustrated in FIGS. 1-3, RADIUS signaling router 102 performs topology hiding for messages originating from a RADIUS client to a RADIUS server. RADIUS signaling router 102 may also perform reverse topology hiding or topology hiding unmapping for certain message types originating from a RADIUS server and destined for a RADIUS client. Reverse RADIUS topology hiding or topology hiding unmapping refers to the mapping of a pseudo NAS identifier to a real NAS identifier and the mapping of a pseudo NAS IP address to a real NAS IP address. Reverse RADIUS topology hiding also includes replacing the pseudo NAS identification parameters in messages directed to RADIUS clients with real NAS identifiers. The reverse topology hiding may be stateful or stateless, depending on whether stateful or stateless topology hiding is implemented for the particular interface.

Two examples of messages that may be sent from a RADIUS server to a RADIUS client that may include pseudo NAS identifiers are change of authorization (CoA) and disconnect request messages. CoA messages are used to change authentication parameters associated with one or more sessions. Disconnect request messages are used to disconnect RADIUS sessions to free resources on the receiving access point.

Figure 4:
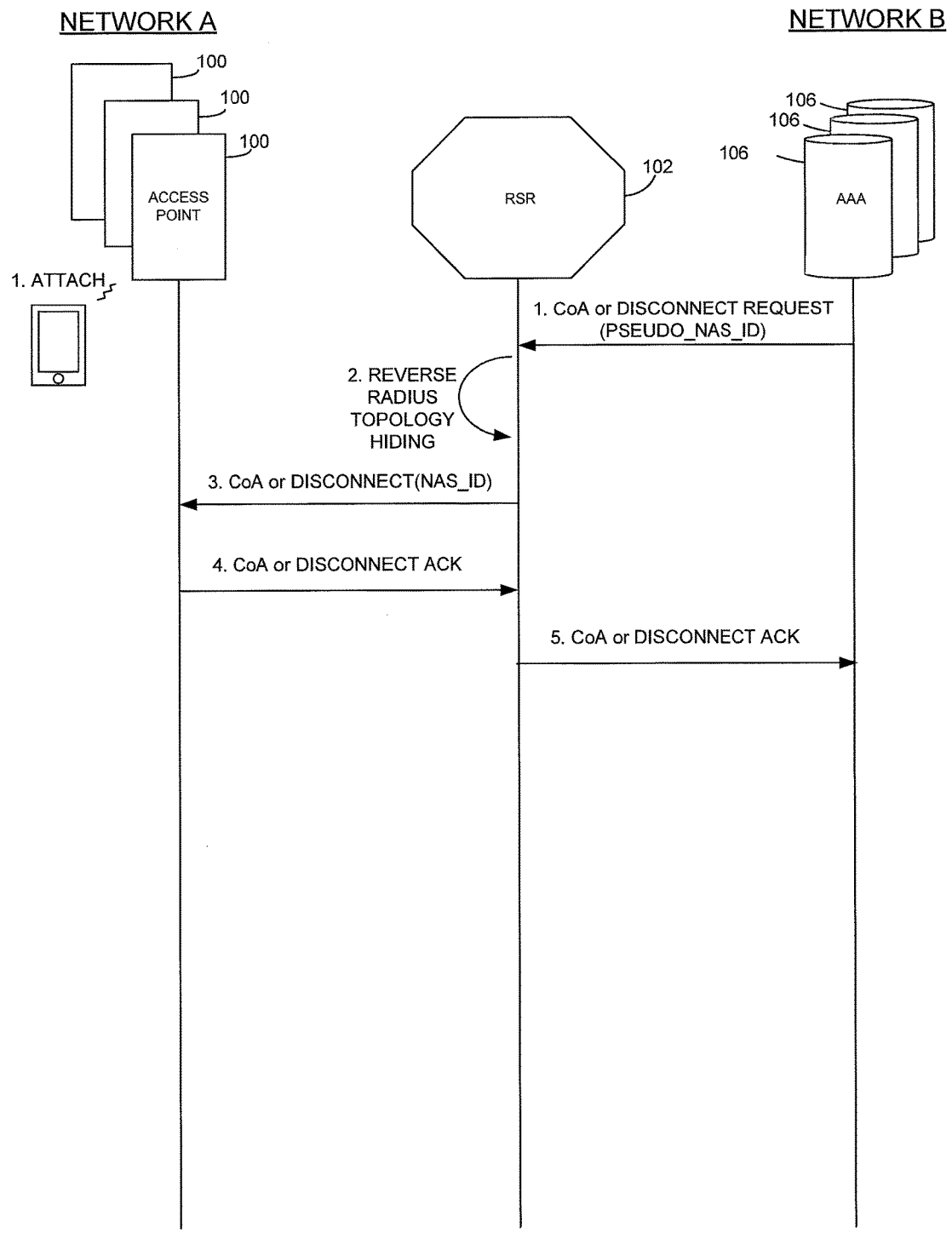
FIG. 4 is a network and message flow diagram illustrating the receipt of a RADIUS change of authorization (CoA) or disconnect request message with a pseudo network access server (NAS) identifier and the mapping of the pseudo NAS identifier to a real NAS identifier by a RADIUS signaling router that implements RADIUS topology hiding according the an embodiment of the subject matter described herein.

FIG. 4 is a message flow diagram illustrating an exemplary message flow for reverse topology hiding performed by RADIUS signaling router 102 for CoA or disconnect request messages. In FIG. 4, it is assumed that RADIUS signaling router 102 has implemented stateful topology hiding for sessions between network A and network B. When network B originates certain messages for the same sessions for which topology hiding is being implemented, the messages may include pseudo NAS identification parameters previously selected by RSR 102. Accordingly, RADIUS signaling router 102 maps the pseudo NAS identification parameters to real NAS identification parameters. In most cases, access points 100 act as RADIUS clients and send messages to AAA servers 106, which act as RADIUS servers. Such messages may have their real NAS identification parameters mapped to pseudo NAS identification parameters by RADIUS signaling router 102, as described above. However, there are certain message types that are unsolicited, originated by AAA servers 106, destined for access points 100, and include NAS identifiers of access points 100. Two examples of such message types are disconnect request messages and CoA request messages described above. Disconnect request messages are sent by a dynamic authorization client, in this example, AAA servers 106, to terminate user sessions on a NAS and discard session context. The disconnect request message is sent on UDP port 3799 and identifies the NAS as well as the user sessions to be terminated by the inclusion of session identification attributes. The NAS responds to the disconnect request with a disconnect acknowledge message if all session context is discarded and the user sessions are no longer active. A change of authorization request message is sent by a dynamic authorization client for dynamically changing session authorizations. A change of authorization request message is used to change data filters. The data filters can be either ingress message filters or egress message filters. The NAS responds to a CoA request message with a CoA acknowledge message if the NAS was able to successfully change the authorizations for the user sessions.

Because both disconnect request and CoA request messages include NAS identification parameters, and the NAS identification parameters may be pseudo NAS identification parameters previously provided by access points 100 RADIUS signaling router 102 may perform reverse RADIUS topology hiding or RADIUS topology hiding unmapping by mapping the pseudo NAS identification parameters to real NAS identification parameters.

RADIUS signaling router 102 may store session identification parameters, the real NAS ID and the pseudo NAS ID for a given session when stateful RADIUS topology hiding is implemented for the session. Thus, in order to perform reverse RADIUS topology hiding, RADIUS signaling router 102 may perform a lookup using the pseudo NAS ID, the accounting session ID, and/or other session identification parameters to determine the real NAS ID stored for a given session. Examples of session identification parameters that may be used to locate the record for a given session may include the username and/or the called station identifier.

Referring to the message flow in FIG. 4, in step 1, one of AAA servers 106 originates a CoA or disconnect request message with the pseudo NAS identifier indicating the NAS associated with the affected session or sessions. In step 2, RADIUS signaling router 102 maps the pseudo NAS identification parameters to real NAS identification parameters. This step may be performed by RSR 102 using the pseudo NAS identifier and/or other parameters in the message to perform a lookup in stored session state information to locate the record for the session and the corresponding real NAS identification parameters. RSR 102 replaces the pseudo NAS identification parameters in the message with the real NAS identification parameters from the record.

In step 3, RADIUS signaling router 102 sends the CoA or disconnect request message to the access point 100 that hosts the associated session or sessions. In step 4, the associated access point 100 generates and sends a RADIUS CoA or disconnect acknowledge message to RSR 102. RSR 102 in step 5, sends the acknowledge message to the AAA server 106 that originated the disconnect or CoA request message. Thus, in FIG. 4, RADIUS signaling router 102 performs reverse RADIUS topology hiding for messages originated by a RADIUS server and destined for a RADIUS client.

Figure 5:
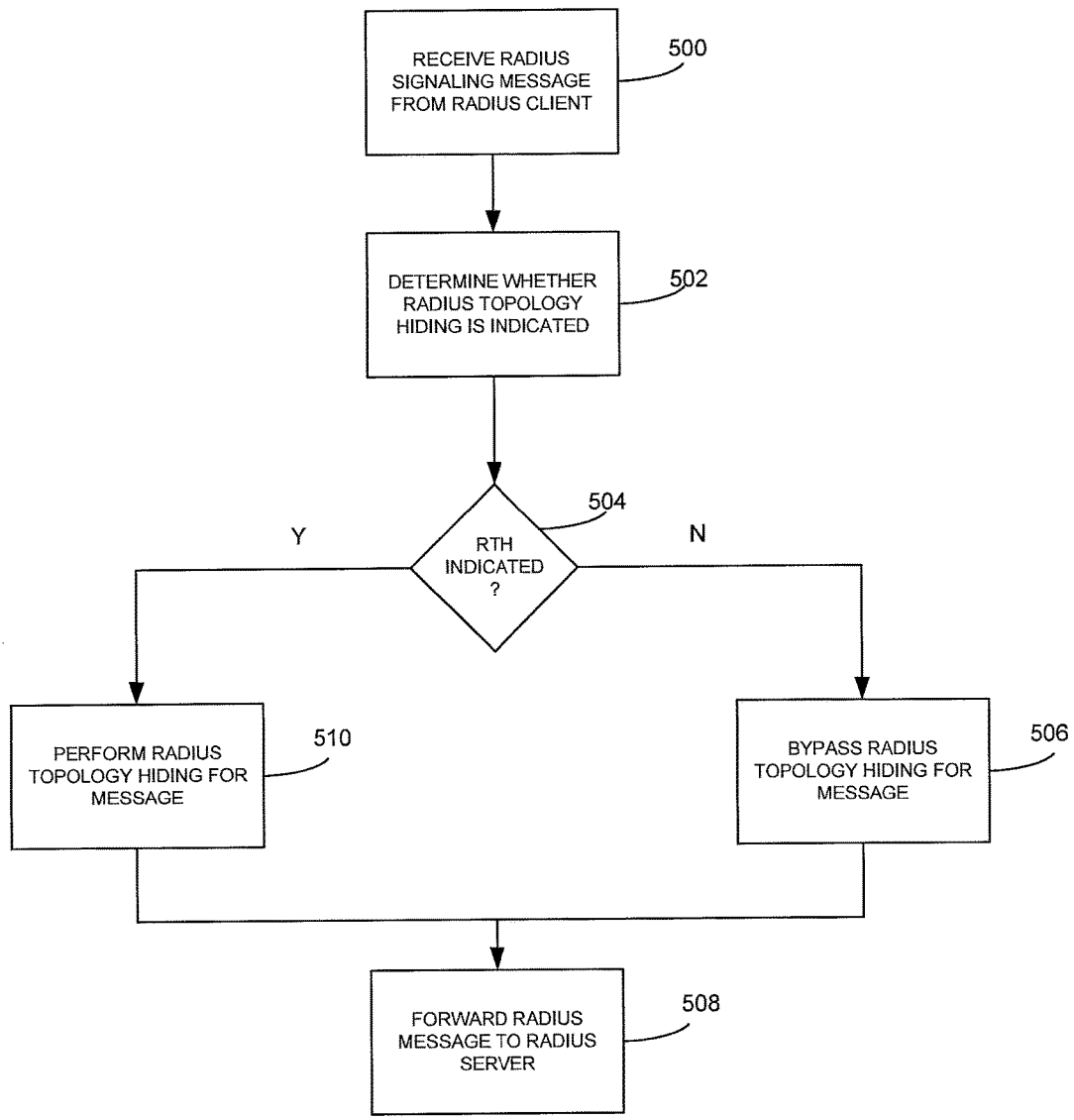
FIG. 5 is a flow chart illustrating an exemplary process for RADIUS topology hiding for messages from a RADIUS client to a RADIUS server according to an embodiment of the subject matter described herein.

FIG. 5 is a flow chart illustrating an exemplary process that may be implemented by RADIUS signaling router 102 in performing topology hiding for messages from a RADIUS client to a RADIUS server. Referring to FIG. 5, in step 500, a RADIUS signaling message is received from a RADIUS client. For example, the RADIUS message may be a RADIUS authentication or accounting request message, as described above with respect to FIGS. 1-3. The RADIUS authentication or accounting request message may include the real NAS identifier and NAS IP address of the originating access point 100.

In steps 502 and 504, it is determined whether RADIUS topology hiding is indicated for the message. Determining whether RADIUS topology hiding is indicated may include accessing stored data, such as that illustrated above with respect to Table 1 to determine whether a trust relationship is configured for the RADIUS client and server for their associated networks or realms. If a trust relationship is configured, RSR 102 may determine that RADIUS topology hiding is not needed, and control proceeds from step 504 to step 506 where RADIUS topology hiding is bypassed. Bypassing RADIUS topology hiding may include refraining from modifying the NAS ID and/or the NAS IP address of the message originator in the RADIUS message such that the NAS ID and the NAS IP address of the RADIUS client, such as one of the access points 100, is present in the outbound message. Control then proceeds to step 508 where the RADIUS message is forwarded to the RADIUS server. For example, RSR 102 may forward the RADIUS request message to one of AAA servers 106.

In steps 502 and 504, if it is determined that RADIUS topology hiding is indicated for the message, i.e., because there is no trust relationship configured or the destination network is specifically indicated as untrusted, control proceeds to 510 where RADIUS topology hiding is performed for the message. Performing RADIUS topology hiding may include replacing the NAS ID of the originating RADIUS client with a pseudo NAS ID. If stateless RADIUS topology hiding is performed, the pseudo NAS ID may be selected algorithmically from a set of stored pseudo NAS IDs. If stateful RADIUS topology hiding is implemented, selecting the pseudo NAS ID may first include determining whether a pseudo NAS ID has already been assigned to the session. If a pseudo NAS ID has already been assigned, then the previously assigned pseudo NAS ID may be used for RADIUS topology hiding for the given message. If a pseudo NAS ID has not already been assigned for the session, selecting a pseudo NAS ID may include algorithmically selecting a pseudo NAS ID from a set of configured pseudo NAS IDs for the real NAS ID in the message and then storing in RSR 102 an association between the pseudo NAS ID and session identification information in the message, such as the username or called station identifier. Subsequent messages that are associated with the same session may select the same pseudo NAS ID using the stored information. Once a pseudo NAS ID has been selected either statelessly or statefully, RSR 102 replaces the real NAS ID in the message with the pseudo NAS ID. Once the RADIUS topology hiding is performed, control proceeds to step 508 where the message is forwarded to the RADIUS server. Thus, FIG. 5 illustrates exemplary processing that may performed by RSR 102 in performing RADIUS topology hiding for messages originating from a RADIUS client that are sent to a RADIUS server.

Figure 6:
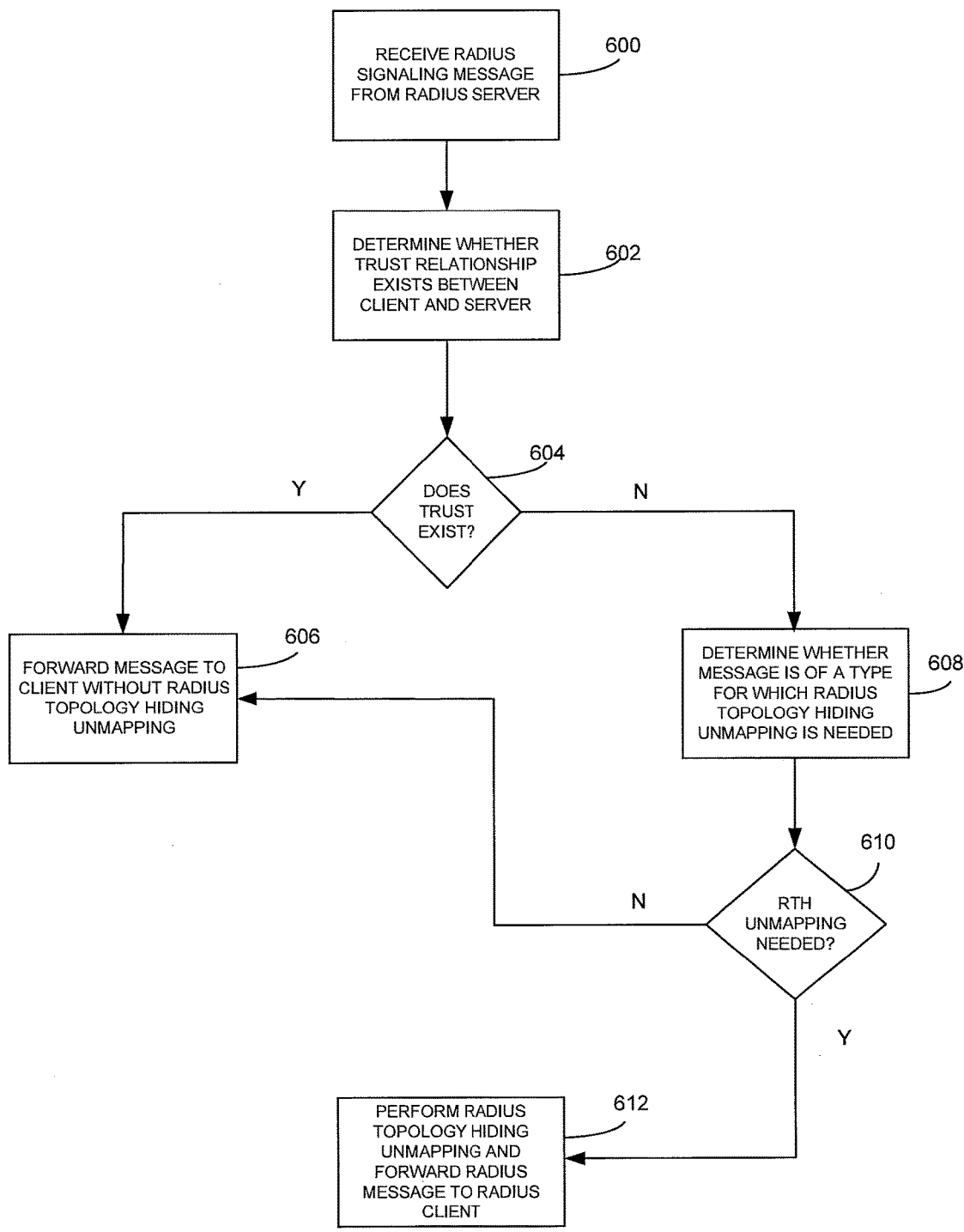
FIG. 6 is a flow chart illustrating an exemplary process for implementing reverse RADIUS topology hiding for messages from a RADIUS server to a RADIUS client according to an embodiment of the subject matter described herein.

For messages originating from a RADIUS server to a RADIUS client, topology hiding unmapping may be needed if topology hiding mapping was performed for a corresponding request message. FIG. 6 illustrates an exemplary process that may be performed by RADIUS signaling router 102 in implementing RADIUS topology hiding unmapping for messages from a RADIUS server to a RADIUS client. Referring to FIG. 6, in step 600, the message is received from a RADIUS server. For example, the message may be a CoA or disconnect request received by RADIUS signaling router 102. In step 602, it is determined whether a trust relationship exists between the client and the server. If a trust relationship exists, this means that topology hiding was not implemented for any previous messages associated with the same session or session, and RADIUS topology hiding unmapping is not needed. Accordingly, control proceeds to step 606 where the RADIUS message is forwarded to the RADIUS client without performing topology hiding unmapping.

In step 604, if it is determined that a trust relationship does not exist, control proceeds to steps 608 and 610 where it is determined whether the message is of a type for which topology hiding unmapping is needed. As stated above, only certain messages originated by RADIUS servers carry pseudo NAS identifiers from prior messages. Two such types of messages are disconnect request and change of authorization messages. Accordingly, if the message is one of these types, topology hiding unmapping may be needed. From step 610, control proceeds to step 612 where the pseudo NAS identification information in the message is unmapped (i.e., mapped back to the real NAS identification information) and the message is forwarded to the RADIUS client. Unmapping the pseudo NAS identification information may include locating the record stored by RSR 102 for the session, locating the real NAS identifier stored in the record, and replacing the pseudo NAS identifier with the corresponding real NAS identifier. After the pseudo NAS identifier replaces the real NAS identifier, control proceeds to step 606 where the message is forwarded to the RADIUS client.

Figure 7:
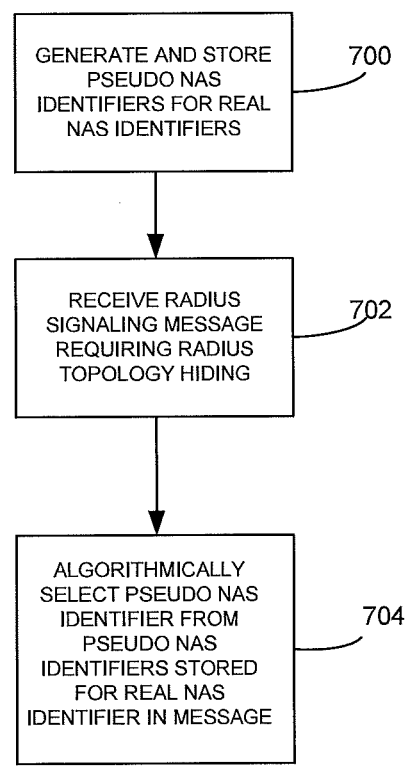
FIG. 7 is a flow chart illustrating an exemplary process for stateless RADIUS topology hiding according to an embodiment of the subject matter described herein.

As stated above, RADIUS topology hiding may be stateless or stateful, depending on whether the RADIUS interface is sessionless or session-based and whether a one-to-one relationship exists between real and pseudo NAS IDs. FIG. 7 is a flow chart illustrating exemplary steps for stateless topology hiding according to an embodiment of the subject matter described herein. Referring to FIG. 7, in step 700, pseudo NAS identifiers are generated and stored for real NAS identifiers for which topology hiding is implemented. A configurable number of pseudo NAS identifiers may be generated and stored for each real NAS identifier. The number of pseudo NAS identifiers may be the same or different for each pseudo NAS identifier, depending on the level of topology hiding that is desired. A network topology could be more effectively hidden if different numbers of pseudo NAS identifiers are configured for the real NAS identifiers, as learning the pseudo NAS identifiers would not give an indication of the real NAS identifiers. Step 700 may be performed at configuration time versus live message processing time.

In step 702, a RADIUS signaling message that requires topology hiding is received. For example, the message may be a RADIUS accounting or authentication message destined for an untrusted network.

In step 704, a pseudo NAS identifier is algorithmically selected from the pseudo NAS identifiers generated and stored for the NAS identifier in the RADIUS message. Algorithmically selecting the pseudo NAS identifier may include providing a random or pseudo random function with the number of pseudo NAS IDs configured for a given real NAS ID, executing the random or pseudo random function to generate an output number and using the output number to select the pseudo NAS identifier to be inserted in the message. Thus, using the steps illustrated in FIG. 7, stateless RADIUS topology hiding may be implement by a RADIUS signaling router.

Figure 8:
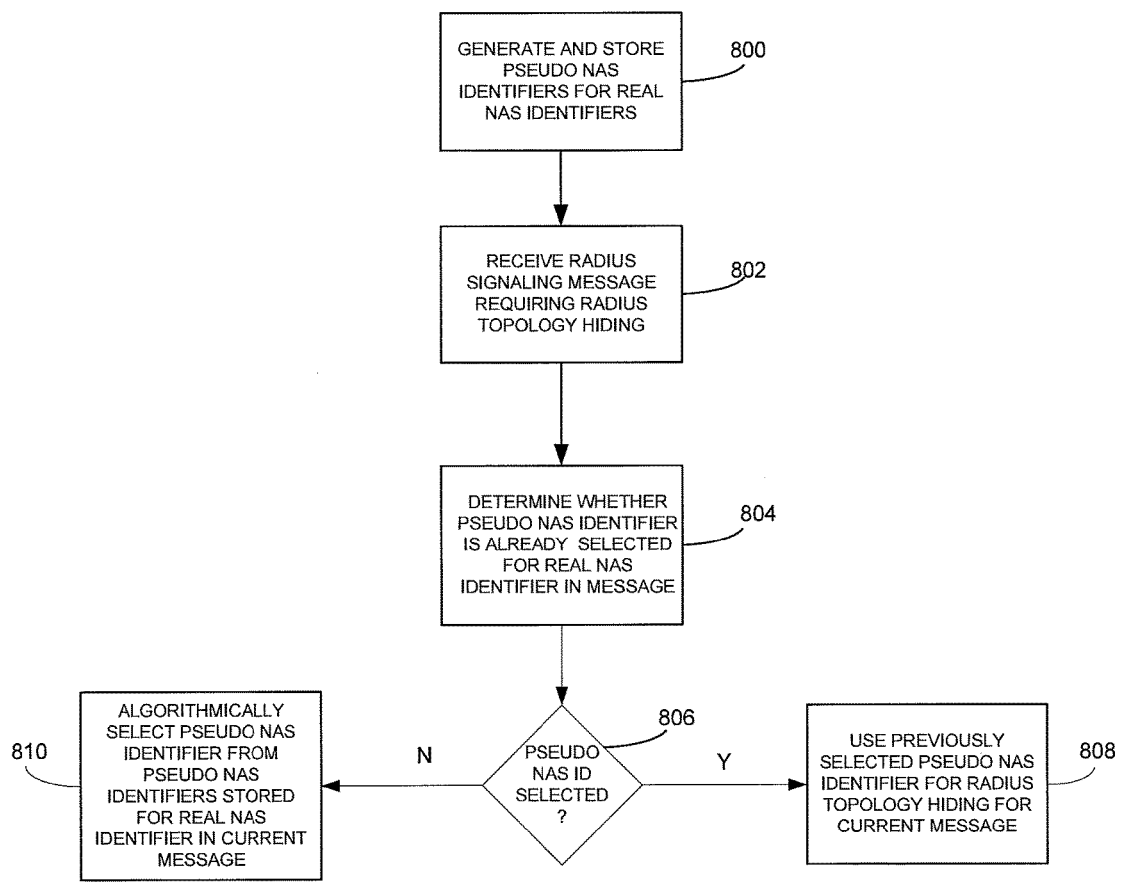
FIG. 8 is a flow chart illustrating an exemplary process for stateful RADIUS topology hiding according to an embodiment of the subject matter described herein.

FIG. 8 illustrates an exemplary process for stateful RADIUS topology hiding that may be implemented by a RADIUS signaling router according to an embodiment of the subject matter described herein. Referring to FIG. 8, in step 800, pseudo NAS identifiers are generated and stored for real NAS identifiers for which topology hiding is implemented. As described with respect to FIG. 7 above, a configurable number of pseudo NAS identifiers may be generated and stored for each real NAS identifier. The number of pseudo NAS identifiers may be the same or different for each pseudo NAS identifier, depending on the level of topology hiding that is desired. Step 800 may be performed at configuration time versus live message processing time.

In step 802, a RADIUS signaling message that requires topology hiding is received. For example, the message may be a RADIUS accounting or authentication message destined for an untrusted network.

In steps 804 and 806, it is determined whether a pseudo NAS identifier has already been selected for the session with which the received message is associated. Determining whether a pseudo NAS identifier has already been selected may include performing a lookup using session identifying parameters, such as the username and called station identifier in a message to determine whether a session exists. If a pseudo NAS identifier has already been assigned to the session, control proceeds to step 808 where the pseudo NAS identifier previously assigned to the session is used for RADIUS topology hiding of the current message.

In step 806, if a pseudo NAS identifier has not been assigned to the session, control proceeds to step 810 where a pseudo NAS identifier is algorithmically selected from the pseudo NAS identifiers generated and stored for the NAS identifier in the RADIUS message. Algorithmically selecting the pseudo NAS identifier may include providing a random or pseudo random function with the number of pseudo NAS IDs configured for a given real NAS ID, executing the random or pseudo random function to generate an output number and using the output number to select the pseudo NAS identifier to be inserted in the message.

In step 812, the pseudo NAS ID, the real NAS ID, and session identification parameters are stored for the session. For example, RSR 102 may store the pseudo NAS ID, the real NAS ID, the session ID and/or other session identification parameters so that RSR will select the same pseudo NAS ID for subsequent messages associated with the same session that require RADIUS topology hiding. Thus, using the steps illustrated in FIG. 8, stateful RADIUS topology hiding may be implement by a RADIUS signaling router.

Figure 9:
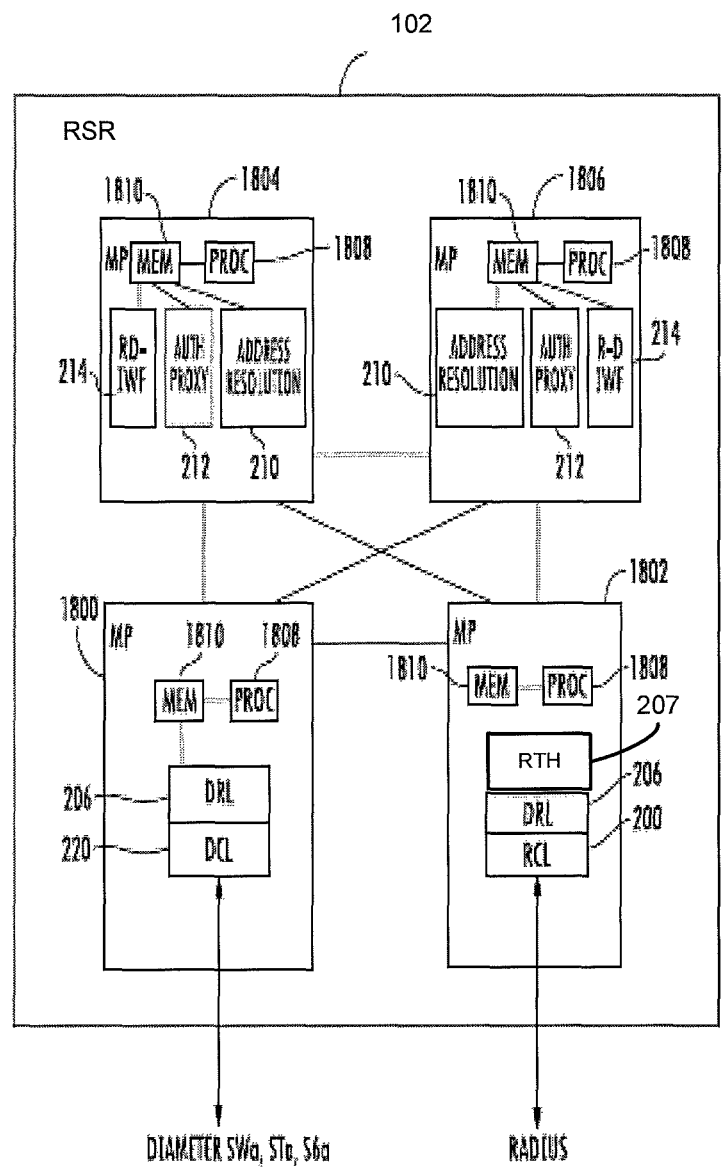
FIG. 9 is a block diagram illustrating exemplary components of a RADIUS signaling router that implements RADIUS topology hiding according to an embodiment of the subject matter described herein.

FIG. 9 is block diagram illustrating an exemplary architecture for RADIUS signaling router 102 according to an embodiment of the subject matter described herein. Referring to FIG. 9, RSR 102 may be implemented on a computing platform that includes Diameter routing capabilities. Thus, RSR 102 may, in addition to performing RADIUS topology hiding, be a Diameter signaling router (DSR) that performs Diameter routing based on Diameter level information in signaling messages. In one exemplary implementation, Diameter messages may be constructed internally within RSR 102 based on parameters extracted from received RADIUS messages. The Diameter messages may then be routed between interfaces of RSR 102 using Diameter routing components. Outbound RADIUS messages may then be constructed from the internal Diameter messages, and the RADIUS messages may be forwarded to their destinations.

In FIG. 9, RSR 102 includes a plurality of message processors 1800, 1802, 1804, and 1806 that perform various functions associated with Diameter routing, address resolution, RADIUS topology hiding and protocol interworking. Each message processor 1800, 1802, 1804, and 1806 may be implemented as a printed circuit board or blade that includes at least one processor 1808 and memory 1810. Message processors 1800, 1802, 1804, and 1806 may be connected to each other via a bus or other suitable internal connection. Each of message processors 1800, 1802, 1804, and 1806 may include a hypervisor (not shown) to virtualize access to underlying hardware resources so that the access network protocol interworking and other components described herein can operate in virtual machine environments.

In the illustrated example, message processor 1800 includes Diameter connection layer (DCL) 220 and a Diameter routing layer (DRL) 206. DCL 220 performs functions for establishing Diameter connections with other nodes over Diameter interfaces, such as SWa and STa interfaces. DRL 206 routes messages based on Diameter level information in the messages.

Message processor 1802 includes RCL 200 that establishes and maintains RADIUS connections with other nodes. RCL 200 receives RADIUS messages and encapsulates received RADIUS messages in Diameter messages, as described above. Message processor 1802 also includes DRL 206 that routes Diameter messages based on Diameter level information. DRL 206, in one implementation, may also determine whether received messages require processing by RADIUS-Diameter interworking function (R-D IWF) 214, an address resolution module 210, or an authentication proxy 212. A RADIUS topology hiding module 207 may be implemented on message processor 1802 to perform the functions described herein for RADIUS topology hiding and reverse RADIUS topology hiding described herein.

Message processor 1804 includes address resolution module 210 that performs range based address resolution and individual subscriber identifier address resolution for RADIUS and Diameter messages. Such address resolution may include performing a lookup based on an IMSI or MSISDN number in a message to determine the appropriate destination for the message and (for Diameter messages) inserting the routing information in the messages for routing the messages to the appropriate destination. For RADIUS messages, the routing information determined by the address resolution may be inserted in the destination host parameter of the Diameter message that encapsulates the RADIUS message within RSR 102 and used for the Diameter route lookup. The encapsulating Diameter message may be removed prior to forwarding the RADIUS message to its destination. Message processor 1804 may also include authentication proxy 212 which performs the functions for authentication proxying for HLR and HSS authentication. Message processor 1804 may also include R-D IWF 214, which performs protocol interworking functions. For example, R-D IWF 214 may perform the access network protocol interworking for interworking between RADIUS and Diameter. Message processor 1806 may be identically provisioned to message processor 1804 and may be provided for redundancy or load sharing purposes.

Thus, when a RADIUS message arrives at message processor 1802, RCL 200 performs RADIUS connection layer functions. RTH module 207 determines whether RADIUS topology hiding is required and implements RADIUS topology hiding if required. DRL 206 builds a Diameter header for the received RADIUS messages and encapsulates the RADIUS messages within the Diameter message. DRL 206 also determines whether address resolution, signaling protocol interworking processing, and/or authentication proxying is required. If any of these applications is required, DRL 206 sends the message to one of message processors 1804 and 1806 for application processing. The applications on the receiving message processor perform required functions and formulate the outbound message. Address resolution may be performed to determine the routing information for the outbound message. Address resolution module 210 forwards the message to the appropriate message processor 1800 or 1802 which forwards the message to its intended next hop.

Accordingly, the architecture illustrated in FIG. 9 is a special purpose machine that performs RADIUS topology hiding, reverse RADIUS topology hiding, address resolution, authentication proxying, and access network signaling protocol interworking for authenticating users on different types of access networks using plural different types of cellular network authentication interfaces. The architecture illustrated in FIG. 9 improves the functionality of both access and cellular networks by seamlessly authenticating user devices to those networks without requiring that the access network and the core cellular network use the same signaling protocol to carry authentication information.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for remote authentication dial-in user service (RADIUS) topology hiding, the method comprising:
   at a RADIUS signaling router including at least one message processor:
   receiving a RADIUS message;
   determining whether RADIUS topology hiding is indicated for the RADIUS message;
   in response to determining that RADIUS topology hiding is indicated for the message, performing RADIUS topology hiding for the message, wherein performing RADIUS topology hiding includes replacing at least one RADIUS network access server (NAS) identification parameter in the message with at least one pseudo NAS identification parameter; and
   forwarding the message to an intended recipient.

2. The method of claim 1 wherein determining whether RADIUS topology hiding is indicated for the RADIUS message includes determining whether a trust relationship exists between a sender and the intended recipient.

3. The method of claim 2 comprising, in response to determining that a trust relationship does not exist between the sender and the intended recipient, bypassing the RADIUS topology hiding and forwarding the RADIUS message to the intended recipient.

4. The method of claim 1 wherein the at least one RADIUS NAS identification parameter includes a RADIUS NAS ID.

5. The method of claim 1 wherein the at least one RADIUS NAS identification parameter includes a RADIUS NAS Internet protocol address.

6. The method of claim 1 wherein performing RADIUS topology hiding includes performing stateless RADIUS topology hiding for the message.

7. The method of 6 wherein performing stateless RADIUS topology hiding includes algorithmically selecting the at least one pseudo NAS identification parameter for the message.

8. The method of claim 1 wherein performing RADIUS topology hiding includes performing stateful RADIUS topology hiding for the message.

9. The method of claim 8 wherein performing stateful RADIUS topology hiding includes determining whether a pseudo NAS identification parameter has already been selected for a session with which the message is associated; and wherein replacing the at least one RADIUS NAS identification parameter in the message includes, in response to determining that a pseudo NAS identification parameter has already been selected for the session with which the message is associated, replacing the at least one RADIUS NAS identification parameter in the message with the previously selected pseudo NAS identification parameter.

10. The method of claim 1 comprising determining whether reverse RADIUS topology hiding is indicated for the message, and, in response to determining that reverse RADIUS topology hiding is indicated, performing reverse RADIUS topology hiding.

11. The method of claim 1 wherein determining whether RADIUS topology hiding is indicated for the message includes determining that RADIUS topology hiding is indicated for the message.

12. A method for remote authentication dial-in user service (RADIUS) topology hiding, the method comprising:
at a RADIUS signaling router including at least one message processor:
receiving a RADIUS message;
determining whether RADIUS topology hiding is indicated for the RADIUS message;
in response to determining that RADIUS topology hiding is indicated for the message, performing RADIUS topology hiding for the message;
determining whether reverse RADIUS topology hiding is indicated for the message, and, in response to determining that reverse RADIUS topology hiding is indicated, performing reverse RADIUS topology hiding, wherein performing reverse RADIUS topology hiding includes replacing a pseudo NAS identifier in the message with a real NAS identifier; and
forwarding the message to an intended recipient.

13. The method of claim 12 wherein determining whether reverse RADIUS topology hiding is indicated for the message includes determining that reverse RADIUS topology hiding is indicated for the message.

14. A system for remote authentication dial-in user service (RADIUS) topology hiding, the system comprising:
a RADIUS signaling router (RSR) including at least one message processor, the at least one message processor including:
a RADIUS connection layer (RCL) for receiving a RADIUS message; and
a RADIUS topology hiding module for determining whether RADIUS topology hiding is indicated for the RADIUS message, in response to determining that RADIUS topology hiding is indicated for the message, performing RADIUS topology hiding for the message, wherein performing RADIUS topology hiding includes replacing at least one RADIUS network access server (NAS) identification parameter in the message with at least one pseudo NAS identification parameter, and forwarding the message to an intended recipient.

15. The system of claim 14 wherein the RADIUS topology hiding module is configured to determine whether a trust relationship exists between a sender of the RADIUS message and the intended recipient.

16. The system of claim 15 wherein the RADIUS topology hiding module is configured to, in response to determining that a trust relationship does not exist between the sender and the intended recipient, bypass the RADIUS topology hiding and forward the RADIUS message to the intended recipient.

17. The system of claim 14 wherein the at least one RADIUS NAS identification parameter includes a RADIUS NAS ID.

18. The system of claim 14 wherein the at least one RADIUS NAS identification parameter includes a RADIUS NAS Internet protocol address.

19. The system of claim 14 wherein the RADIUS topology hiding module is configured to perform stateless RADIUS topology hiding for the message.

20. The system of claim 19 wherein performing stateless RADIUS topology hiding includes algorithmically selecting the at least one pseudo NAS identification parameter for the message.

21. The system of claim 14 wherein the RADIUS topology hiding module is configured to perform stateful RADIUS topology hiding for the message.

22. The system of claim 21 wherein performing stateful RADIUS topology hiding includes determining whether a pseudo NAS identification parameter has already been selected for a session with which the message is associated; and wherein replacing the at least one RADIUS NAS identification parameter in the message includes, in response to determining that a pseudo NAS identification parameter has already been selected for the session with which the message is associated, replacing the at least one NAS identification parameter in the message with the previously selected pseudo NAS identification parameter.

23. The system of claim 14 wherein the RADIUS topology hiding module is configured to determine whether reverse RADIUS topology hiding is indicated for the message, and, in response to determining that reverse RADIUS topology hiding is indicated, perform reverse RADIUS topology hiding.

24. The system of claim 14 wherein determining whether RADIUS topology hiding is indicated for the message includes determining that RADIUS topology hiding is indicated for the message.

25. A system for remote authentication dial-in user service (RADIUS) topology hiding, the system comprising:
- a RADIUS signaling router (RSR) including at least one message processor, the at least one message processor including:
  - a RADIUS connection layer (RCL) for receiving a RADIUS message; and
  - a RADIUS topology hiding module for determining whether RADIUS topology hiding is indicated for the RADIUS message, and, in response to determining that RADIUS topology hiding is indicated for the message, performing RADIUS topology hiding for the message, wherein the RADIUS topology hiding module is configured to determine whether reverse RADIUS topology hiding is indicated for the message, and, in response to determining that reverse RADIUS topology hiding is indicated, perform reverse RADIUS topology hiding, wherein performing reverse RADIUS topology hiding includes replacing a pseudo NAS identifier in the message with a real NAS identifier, and wherein the RADIUS topology hiding module is configured to forward the message to an intended recipient.

26. The system of claim 25 wherein determining whether reverse RADIUS topology hiding is indicated for the message includes determining that reverse RADIUS topology hiding is indicated for the message.

27. A non-transitory computer readable medium having stored thereon executable instructions that when executed by a processor of a computer controls the computer to perform steps comprising:
- at a remote authentication dial-in user service (RADIUS) signaling router including at least one message processor:
  - receiving a RADIUS message;
  - determining whether RADIUS topology hiding is indicated for the RADIUS message;
  - in response to determining that RADIUS topology hiding is indicated for the message, performing RADIUS topology hiding for the message, wherein performing RADIUS topology hiding includes replacing at least one RADIUS network access server (NAS) identification parameter in the message with at least one pseudo NAS identification parameter; and
  - forwarding the message to an intended recipient.

28. The non-transitory computer readable medium of claim 27 wherein determining whether RADIUS topology hiding is indicated for the message includes determining that RADIUS topology hiding is indicated for the message.

* * * * *

UNITED STATES PATENT AND TRADEMARK OFFICE
CERTIFICATE OF CORRECTION

PATENT NO. : 10,033,736 B2  
APPLICATION NO. : 15/003647  
DATED : July 24, 2018  
INVENTOR(S) : McCann Page 1 of 1

It is certified that error appears in the above-identified patent and that said Letters Patent is hereby corrected as shown below:

On the Title Page

On page 2, Column 1, item (56) under Other Publications, Line 15, delete "Hiding."" and insert -- Hiding," --, therefor.

On page 2, Column 2, item (56) under Other Publications, Line 25, delete "Mobiiity" and insert -- Mobility --, therefor.

On page 2, Column 2, item (56) under Other Publications, Line 30, delete "(Reiease 9):"" and insert -- (Release 9)," --, therefor.

On page 2, Column 2, item (56) under Other Publications, Line 32, delete ""Platform."" and insert -- "Platform," --, therefor.

On page 2, Column 2, item (56) under Other Publications, Line 50, delete "http://" and insert -- https:// --, therefor.

On page 2, Column 2, item (56) under Other Publications, Line 54, delete "Unifed" and insert -- Unified --, therefor.

In the Claims

In Column 15, Line 20, in Claim 7, after "of" insert -- claim --.

Signed and Sealed this  
Fourteenth Day of May, 2019

Andrei Iancu  
*Director of the United States Patent and Trademark Office*